Sept. 22, 1959   W. G. COPENHAVER   2,905,537
APPARATUS FOR HYDROLYSIS OF ALUMINUM CHLORIDE
Filed Dec. 17, 1956

INVENTOR.
W. G. COPENHAVER

BY Hudson & Young

ATTORNEYS

United States Patent Office 2,905,537
Patented Sept. 22, 1959

2,905,537

APPARATUS FOR HYDROLYSIS OF ALUMINUM CHLORIDE

William G. Copenhaver, Phillips, Tex., assignor to Phillips Petroleum Company, a corporation of Delaware Application December 17, 1956, Serial No. 628,885

4 Claims. (Cl. 23—283)

This invention relates to a method and apparatus for hydrolyzing aluminum halide-hydrocarbon sludge. In another aspect it relates to a method and apparatus for completely hydrolyzing aluminum chloride-hydrocarbon sludge resulting from catalytic reactions of hydrocarbons for which aluminum chloride was the catalyst.

By the term aluminum halide I mean trihalide salts of aluminum, the more common of which is aluminum chloride. However, I do not wish to limit my invention to the hydrolysis of aluminum chloride sludge alone because, in some cases, the sludge contains minor amounts of aluminum bromide resulting from the use of minor amounts of aluminum bromide with aluminum chloride in the catalyst. However, for the purposes of this specification and claims I will explain my method and apparatus as applied to the treatment of aluminum chloride-hydrocarbon sludge. In instances when minor amounts of aluminum bromide are used with the aluminum chloride as catalyst in catalytic reactions the same general type of sludge is formed as when aluminum chloride alone is used.

When aluminum chloride-hydrocarbon sludge is hydrolyzed by contacting the sludge with water in a tower, hydrolysis is frequently incomplete. The incompletely hydrolyzed sludge is passed from the hydrolyzing tower into a settling tank and the oil liberated in the hydrolysis is recovered by skimming. The partially hydrolyzed aluminum chloride-water phase is then passed to disposal. In areas which are sparsely settled disposal of such partially hydrolyzed aluminum chloride is sometimes made by allowing the material to flow into a canyon or even onto the open ground, to be washed away eventually with flood waters, or the aqueous stream of the partially hydrolyzed material flowed into naturally flowing water streams. In recent times restrictions have been imposed against stream pollution, and other and more efficient means of treatment and disposal have become necessary. It has also been found necessary in some cases to use water in the hydrolyzing reaction which did not contain a very high concentration of salt because water containing high concentrations of salt produces precipitates which form large oil-containing clusters with the oil liberated from the sludge, thereby making final separation and recovery of the oil very difficult. If the aluminum chloride is not completely hydrolyzed and the unhydrolyzed portion is protected from further hydrolysis by retention in the above-mentioned oil-containing clusters upon dumping of the aqueous phase containing unhydrolyzed aluminum chloride into a gully or onto the ground, the aluminum chloride will be hydrolyzed at some subsequent time with the liberation of free hydrocarbon chloride at possibly an undesired time and place.

An object of my invention is to provide a method and apparatus for hydrolyzing aluminum chloride-hydrocarbon sludge.

Another object of my invention is to provide a method and apparatus for completely hydrolyzing such sludge.

Still another object of my invention is to provide a method and apparatus for complete hydrolysis of such sludge and recovery of the liberated oil.

Other objects and advantages will be realized upon reading the following description which, taken with the attached drawing, forms a part of this specification.

In the drawing Figure 1 illustrates, in diagrammatic form, an elevational view, partly in section, of apparatus in which to practice the method of my invention.

Figure 1:
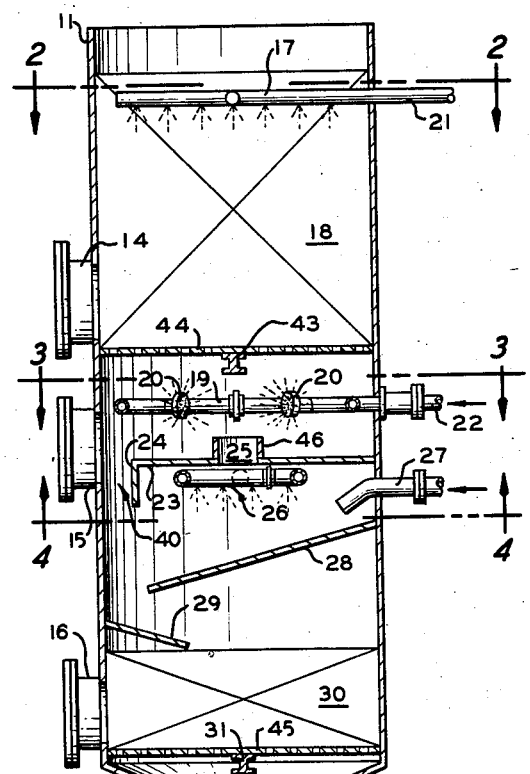

According to my invention I provide a method for hydrolyzing an aluminum halide-hydrocarbon sludge comprising introducing said sludge into a tubular zone, flowing the sludge across said zone, contacting said sludge with steam and thereby decomposing a portion of said sludge with evolution of hydrogen halide, contacting the evolved hydrogen halide and steam with water added to a level above the steam addition level thereby absorbing at least a portion of the evolved hydrogen halide in said water and condensing the steam, contacting this water containing hydrogen halide and the steam contacted sludge thereby decomposing a further portion of said sludge, further contacting these latter materials by passing same into a first bed of contact promoting material thereby decomposing the remainder of the aluminum halide-hydrocarbon sludge and evolving additional hydrogen halide, absorbing this additional hydrogen halide in the water containing hydrogen halide passed into said first bed of contact promoting material, withdrawing hydrolyzed material and aqueous hydrogen halide from the lower portion of said zone as the product of the operation.

Also, I provide an apparatus comprising an elongated tubular vessel, the axis of said vessel being upright, a first conduit in communication with the interior of said vessel for inlet of material to be treated, a first tray in said vessel disposed below the level of inlet of said first conduit, said first tray sloping downward and away from said inlet and extending across a major section of said vessel, and leaving the remaining minor section of said vessel unobstructed, a first spray means disposed above said tray, said first spray means in said second tray for passage only of vapor upward therethrough, said second and first trays extending across substantially the same major portion of said vessel, a second spray means immediately above said second tray for inlet water, a second bed of vapor-liquid contact promoting means in the upper portion of said vessel and above said second spray means, and a third spray means for inlet of water to said second bed of contact promoting material.

Referring now to the drawing reference numeral 11 identifies a vertically disposed tubular vessel having its upper end open, if desired. The vessel is provided with a conical bottom 12 having an outlet 13. Manholes 14, 15, and 16 are provided as shown for convenience in construction and for adding or removing material from the vessel. Reference numeral 18 identifies a body of vapor-liquid contact promoting materials such as ceramic saddles, rings or other vapor-liquid contacting materials which possess relatively high surface areas. A water spray cross 17 is provided either above contact material 18 or embedded therein as illustrated in the drawing. A support 43 supports a bed plate element 44 to carry the weight of the contact promoting material 18. Immediately below support 43 is disposed a pipe 19 provided with sprays 20 for inlet of water into the vessel from a water inlet pipe 22. Immediately below this water inlet pipe is disposed a tray 23 which extends across the major portion of the vessel and the edge of tray 23 is provided with a depending baffle 24 which defines a conduit with the adjacent circular wall of the vessel. In about the center of tray 23 is disposed an opening 25 constructed in such a manner as to permit upward flow of vapor without permitting downflow of liquid from the top surface of the tray. Opening 25 is provided with walls 46 as illustrated.

Immediately below tray 23 and disposed in about the center of the vessel is a spray assembly 26 for inlet of steam. Adjacent this spray assembly 26 and extending to the wall of the vessel is a conduit 27 for inlet of the aluminum halide-hydrocarbon sludge material to be treated. To receive the sludge material from conduit 27 is a sloping tray 28 which extends across the major portion of the vessel and terminates at such a position in the vessel that the material discharged therefrom will be substantially directly below conduit 40. Below the lower edge of tray 28 is a second sloping baffle intended to divert material reaching its upper surface to more nearly the center of the vessel. Below baffle 29 is disposed a second bed of fluid-liquid contact promoting material 30. This material can also be ceramic rings, saddles or other suitable materials adapted for promoting fluid-liquid contacting. Contact promoting material 30 is supported by bed plate 45 which, in turn, is at least partially supported by a support member 31.

Figure 2:
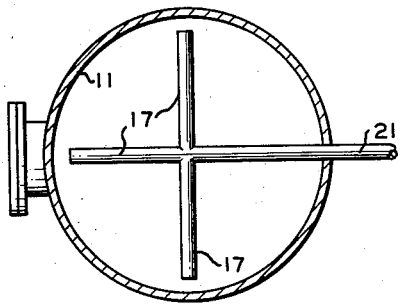
Figure 2 is a sectional view taken along the line 2—2 of Figure 1.
Figure 3:
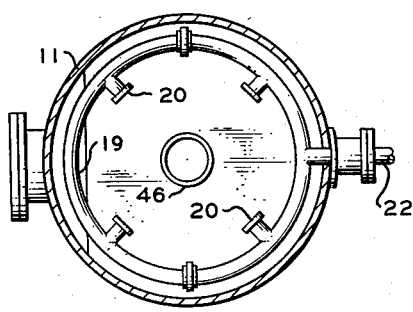
Figure 3 is a sectional view taken along the line 3—3 of Figure 1.
Figure 4:
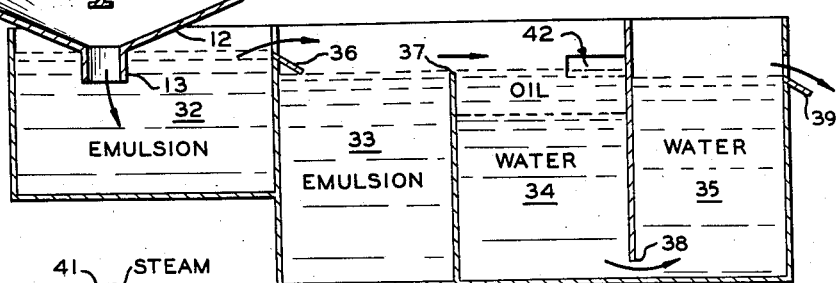
Figure 4 is a sectional view taken along the line 4—4 of Figure 1.
Figure 4:
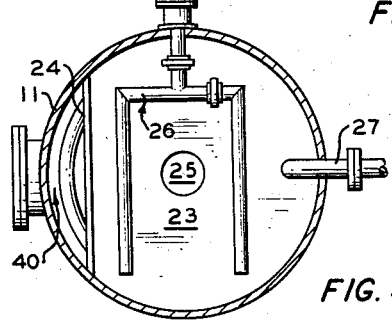

Opening 13 in the bottom of vessel 11 is intended to discharge into a first reservoir 32 provided with an overflow weir 36. Weir 36 is intended to discharge material from reservoir 32 into a second reservoir 33. Partition 37 is of such height and is slotted as to permit relatively streamlined flow of liquid from reservoir 33 into settler tank 34. An outlet 42 permits removal of an oil phase while partition 38 does not reach the bottom of settler tank 34 and overflow tank 35 and permits underflow of water from tank 34 to tank 35. This latter tank is provided with a weir 39 or other overflow means for discharging water for such disposal as desired. In Figure 4 a pipe 41 is illustrated as being provided for supplying steam to the steam spray assembly 26. Figure 2 also shows a conduit 21 for passage of water to the spray cross 17.

Trays 23 and 28 and baffle 29 are, if desired, welded into place or they may be bolted or inserted in vessel 11 by any suitable means. Similarly, support members 31 and 43 and bed plates 45 and 44 are supported by welding or other suitable means to the inner walls of the vessel 11.

In the operation of my invention aluminum chloride-hydrocarbon sludge from a catalytic process, not shown, is introduced into the vessel 11 by way of inlet conduit 27. The material is discharged upon the upper surface of the sloping tray 28 and slowly flows downward across this tray and, in so doing, is treated with steam issuing from spray assembly 26. Hydrolysis of the sludge at this point is rapid but not necessarily complete and this partially hydrolyzed sludge flows from the edge of tray 28 to the sloping baffle 29 for passage to a more centrally located position in the vessel. The hydrolysis reaction taking place on the top of sloping tray 28, as is well known, evolves copious amounts of hydrogen chloride and this gas is intended to pass upward through opening 25 in tray 23. Water is introduced from a source, not shown, through pipe 22 into the water inlet ring 29 and is sprayed into the vessel through sprays 20 for absorbing as much as possible of the aforementioned hydrogen chloride and to condense the steam. Any hydrogen chloride not so absorbed passes upward into the contact material 18. Additional water from a source, not shown, enters the system by way of pipe 21 and is sprayed through the spray cross 17 and countercurrently contacts the upflowing hydrogen chloride to complete the absorption thereof. Water from the upper portion of the vessel containing its charge of absorbed hydrogen chloride passes downward through conduit 40 and further contacts the partially hydrolyzed sludge at the lower end of the sloping tray 28 and on tray 29. This hydrogen chloride containing water, along with the aforementioned partially hydrolyzed sludge, is diverted toward the center of the vessel at the top of the contact promoting material 30. While passing downward through this latter contact promoting material the water is intended to complete the hydrolysis of the sludge with absorption of the hydrogen chloride evolved thereby. By the time the materials reach the bottom of the bed 30 it is intended that the sludge is completely hydrolyzed and the materials at this point comprise a water solution of hydrogen chloride and containing suspended aluminum hydroxide and any other fully hydrolyzed aluminum containing material stable in the presence of aqueous hydrochloric acid.

This material passes from vessel 11 through outlet 13 into the first reservoir 32 which is merely a receiving tank. From this tank aqueous material overflows weir 36 into a second reservoir 33 in which an appreciable amount of phase separation between oil and an aqueous phase occurs. Relatively streamlined flow of liquid from reservoir 33 passes through the slotted partition 37 into settler 34 in which separation of oil and an aqueous phase is substantially complete. The supernatant oil phase is removed through outlet 42 for such disposal as desired and the aqueous phase underflows partition 38 into the overflow tank or chamber 35 from which the water containing hydrogen chloride and any suspended matter and water soluble salts overflows weir 39 for such disposal as desired. This disposal can be into a pond or lake or in arid to semiarid regions which are sparsely settled, this aqueous material can be discharged onto the ground surface or into a gully. Acid is ordinarily consumed by the elements of the soil so that after a short period of time the water is substantially acid-free.

In one instance, and as an example of the operation of the process of my invention, approximately 1,175 pounds per hour of aluminum chloride-hydrocarbon sludge containing about 62 percent aluminum chloride is fed to the tower 11 and discharged upon a sloping tray. Steam was injected into the vessel in contact with this sludge at the rate of about 473 pounds per hour. The steam was saturated at 235 pounds per square inch gage, which pressure corresponds to a temperature of approximately 400° F. About 1,800 gallons per hour of water at ambient temperature was introduced through ring 19 and spray nozzles 20 for absorption of the evolved hydrogen chloride and for condensation of the steam. A further 1,800 gallons per hour of water at ambient temperature was sprayed into the upper portion of contact promoting material 18 for absorption of the final traces of the evolved hydrogen chloride so that any vapors or gases issuing from the open top of vessel 11 will be free of acid.

In the operation of my invention approximately 75 percent of the sludge is hydrolyzed by the injected steam, the remainder being hydrolized by the acid containing water.

While it is realized that with sufficient time and length of hydrolyzing tower water alone could probably hydrolyze all of the sludge without need for steam as herein disclosed, but when using water alone a tower which is exceedingly long will be required and, of course, such a tower is much more costly to construct, install and operate than is a much shorter tower.

As is well known, such hydrolyzing reactions evolving acid will dissolve or corrode iron and steel equipment very rapidly and it is necessary to employ such an acid-resisting alloy in the construction of all metal parts of this apparatus exposed to the acid as Hastelloy B metal. This alloy is a molybdenum containing alloy which also includes small amounts of cobalt, silica and manganese along with about 6 percent iron. The tower can, in some instances, also be made of carbon steel when provided with an acid resistant brick lining.

Auxiliary equipment, such as valves and meters and pressure and temperature indicating and recording apparatus, is not disclosed herein for purposes of brevity. The need and installation and operation of such equipment are well understood by those skilled in the art.

Although certain embodiments of the invention have been described for illustrative purposes, the invention obviously is not limited thereto.

I claim:

1. An apparatus comprising a tubular vessel, the axis of said vessel being upright, a first conduit communicating with the interior of said vessel for inlet of material to be treated, a first tray in said vessel disposed below the level of inlet of said first conduit, said first tray sloping downward and away from said inlet and extending across a major section of said vessel and leaving the remaining minor section of said vessel unobstructed, a first spray means disposed above said tray, a first bed of fluid-liquid contact promoting means below said first tray, an outlet for liquid from said vessel below said first contact promoting means, a second tray extending across a major portion of said vessel at a level immediately above said first spray means, means in said second tray for passage only of vapor upward therethrough, said second and first trays extending across substantially the same major portion of said vessel, a second spray means immediately above said second tray, a second bed of vapor-liquor contact promoting means in the upper portion of said vessel and above said second spray means, and a third spray means above said second bed of contacting promoting material.

2. An apparatus comprising an elongated tubular vessel, the axis of said vessel being upright, a first conduit in communication with the interior of said vessel for inlet of material to be treated, a first tray in said vessel disposed below the level of inlet of said first conduit, said first tray sloping downward and away from said inlet and extending across a major section of said vessel and leaving the remaining minor section of said vessel unobstructed, a first spray means disposed above said tray, said first spray means being adapted for inlet of steam, a first bed of fluid-liquid contact promoting means below said first tray, an outlet for liquid from said vessel below said first contact promoting means, a second tray extending across a major portion of said vessel at a level immediately above said first spray means, means in said second tray for passage only of vapor upward therethrough, said second and first trays extending across substantially the same major portion of said vessel, a second spray means immediately above said second tray for inlet of water, a second bed of vapor-liquid contact promoting means in the upper portion of said vessel and above said second spray means, and a third spray means for inlet of water to said second bed of contacting promoting material.

3. In the apparatus of claim 2 a liquid-liquid phase separating means in communication with said outlet.

4. In the apparatus of claim 2, a first baffle extending downward from the nonperipheral edge of said second tray forming a conduit intermediate said baffle and the adjacent wall of said vessel, and a second and sloping baffle below said first tray extending from the wall of said vessel opposite said first tray to direct downflowing material away from the last mentioned wall.

References Cited in the file of this patent

UNITED STATES PATENTS

| | | |
|---|---|---|
| 1,987,278 | Wilson | Jan. 8, 1935 |
| 2,147,161 | Haglund | Feb. 14, 1939 |
| 2,234,057 | Mount | Mar. 4, 1941 |
| 2,339,786 | Larsen et al. | Jan. 25, 1944 |
| 2,376,696 | Hixson | May 22, 1945 |
| 2,549,549 | Wall | Apr. 17, 1951 |